United States Patent
Lee et al.

(10) Patent No.: US 10,417,535 B2
(45) Date of Patent: Sep. 17, 2019

(54) INFILL APPARATUS AND METHOD FOR OUTPUT OF 3D PRINTER

(71) Applicants: SINDOH CO., LTD., Seoul (KR); SEOUL NATIONAL UNIVERSITY R&DB FOUNDATION, Seoul (KR)

(72) Inventors: Ju Sung Lee, Seoul (KR); Kun Woo Lee, Seoul (KR); Hyung Jun Kim, Seoul (KR); Se Woong Yang, Incheon (KR)

(73) Assignees: SINDOH CO., LTD, Seoul (KR); SEOUL NATIONAL UNIVERSITY R&DB FOUNDATION, Seoul (KR)

(*) Notice: Subject to any disclaimer, the term of this patent is extended or adjusted under 35 U.S.C. 154(b) by 202 days.

(21) Appl. No.: 15/673,823

(22) Filed: Aug. 10, 2017

(65) Prior Publication Data
US 2018/0043622 A1 Feb. 15, 2018

(30) Foreign Application Priority Data
Aug. 11, 2016 (KR) .......................... 10-2016-0102341

(51) Int. Cl.
*G06K 15/00* (2006.01)
*B33Y 10/00* (2015.01)
(Continued)

(52) U.S. Cl.
CPC ............ *G06K 15/00* (2013.01); *B29C 64/386* (2017.08); *B29C 64/393* (2017.08); *B33Y 10/00* (2014.12); *B33Y 50/00* (2014.12); *B33Y 50/02* (2014.12); *G05B 19/4099* (2013.01); *B29C 64/118* (2017.08); *G05B 2219/49007* (2013.01); *Y02P 80/40* (2015.11)

(58) Field of Classification Search
None
See application file for complete search history.

(56) References Cited

U.S. PATENT DOCUMENTS

| 2014/0324204 A1* | 10/2014 | Vidimce | B29C 67/0088 700/98 |
| 2015/0148930 A1* | 5/2015 | Kumar | G06T 19/20 700/98 |

FOREIGN PATENT DOCUMENTS

| KR | 10-2015-0120643 | 12/2015 |
| KR | 10-2016-0018096 | 2/2016 |

* cited by examiner

*Primary Examiner* — Jeffrey J Chow
(74) *Attorney, Agent, or Firm* — Nixon & Vanderhye P.C.

(57) ABSTRACT

An infill apparatus and method for an output of a 3D printer, including a unit block generating part which slices a 3D model by using three planes orthogonal to each other to generate unit blocks; a unit block classifying part which classifies the unit blocks into boundary unit blocks and internal unit blocks according to positions thereof and classifies the boundary unit blocks into flat roof unit blocks and non-flat roof unit blocks according to whether or not a flat roof region is included; a combined block generating part which merges the internal unit blocks and generates a combined block; a flat roof point discriminating part which discriminates flat roof points in the combined block; a combined block dividing part which divides a part of the combined block including the flat roof points; and an infill shape determining part which determines a divided surface (or contact surface) of the combined block divided by the combined block dividing part as infill shape and outputs a printing material to the infill shape during outputting.

12 Claims, 5 Drawing Sheets

(51) Int. Cl.
*B33Y 50/02* (2015.01)
*B29C 64/393* (2017.01)
*G05B 19/4099* (2006.01)
*B33Y 50/00* (2015.01)
*B29C 64/386* (2017.01)
*B29C 64/118* (2017.01)

INFILL APPARATUS AND METHOD FOR OUTPUT OF 3D PRINTER

CROSS-REFERENCE TO RELATED APPLICATION

This application claims priority to and the benefit of Korean Patent Application No. 2016-0102341, filed on Aug. 11, 2016, the disclosure of which is incorporated herein by reference in its entirety.

BACKGROUND

1. Field of the Invention

The present invention relates to an infill apparatus and method for an output of a 3D printer, which is capable of allowing outputs from a 3D printer to be stably stacked.

2. Discussion of Related Art

Generally, in order to manufacture a pilot product with a 3D shape, a mock-up manufacturing method which is performed manually depending on drawings and a manufacturing method by CNC milling are widely known. However, since the mock-up manufacturing method depends on a manual operation, it is difficult to accurately perform numerical control, and it takes a lot of time. For the manufacturing method by the CNC milling, it is possible to accurately perform the numerical control, but there are many shapes that are difficult to machine due to tool interference.

Therefore, recently, there has been proposed a so-called 3D printing method in which a designer of a product generates 3D modeling data using CAD or CAM and manufactures a pilot product with a 3D shape using the generated data. These 3D printers are used in various fields such as industry, life and medicine. The 3D printer is a manufacturing apparatus which outputs, like a two-dimensional printer, continuous layers of a material and stacks the layers to produces objects. The 3D printer can quickly produce an object based on digitized drawing information and thus can be mainly used to manufacture a prototype sample.

A product molding method of the 3D printer includes a method in which a light-curable material is scanned with a laser beam and a light-scanned portion is formed as an object, a method of cutting and molding a molding material, a method of melting and stacking a thermoplastic filament (FDM method), and so on.

Figure 1:
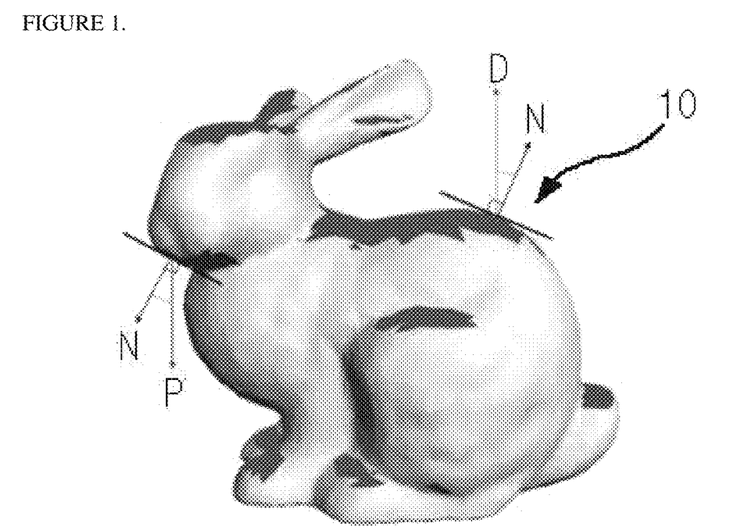
FIG. 1 is a schematized view of a flat roof region of a 3D output.

Among them, in case of the FDM type 3D printer, a region in which infill is required, that is, a region in which stacking is impossible without additional resin reinforcement is generated in a 3D output. Like an overhang region which is a term mainly used in external support, the region in which the above-described stacking is impossible can be defined as a flat roof. Referring to FIG. 1, in a flat roof region 10 indicated in red, an angle formed by a normal direction N of a tangent line at an arbitrary point directed upward and a resin stacking direction D is smaller than a predetermined angle, and thus stacking is impossible without infill, i.e., additional resin reinforcement. Meanwhile, in FIG. 1, a portion indicated in blue is an overhang region in which an angle formed by a normal direction N of a tangent line at an arbitrary point directed downward and a vertical direction P is smaller than a predetermined angle.

In order to stably stack such a flat roof region, conventionally, a method in which a two-dimensional pattern in an X-Y plane is stacked in a Z-axis direction was used. In this method, there is an advantage that a resin can be stably stacked and a pattern can be easily formed because the resin is stacked only in the Z-axis direction. However, since an inside of an output is filled only with a uniform density without considering shape characteristics of a 3D output object, the method is inefficient, that is, material consumption is increased, and a long manufacturing time is required.

Related technical document 1: Korean Patent Publication No. 10-2016-0018096 (Feb. 17, 2016)

Related technical document 2: Korean Patent Publication No. 10-2015-0120643 (Oct. 28, 2015)

SUMMARY OF THE INVENTION

The present invention relates to an infill apparatus and method for an output of a 3D printer which can minimize a material and a manufacturing time while supporting an inside of a 3D output to increase the possibility of stacking a 3D output.

According to an aspect of the present invention, there is provided an infill apparatus for an output of a 3D printer, including a unit block generating part which slices a 3D model by using three planes orthogonal to each other to generate unit blocks; a unit block classifying part which classifies the unit blocks into boundary unit blocks and internal unit blocks according to positions thereof and classifies the boundary unit blocks into flat roof unit blocks and non-flat roof unit blocks according to whether or not a flat roof region is included; a combined block generating part which merges the internal unit blocks and generates a combined block; a flat roof point discriminating part which discriminates flat roof points in the combined block; a combined block dividing part which divides a part of the combined block including the flat roof points; and an infill shape determining part which determines a divided surface (or contact surface) of the combined block divided by the combined block dividing part as infill shape and outputs a printing material to the infill shape during outputting.

The unit block generating part may tilt three vertical planes orthogonal to each other so that an angle of each surface of the unit blocks with respect to a stacking direction is 45 degrees or more.

The combined block generating part may basically merge the internal unit blocks so that a boundary between the boundary unit blocks and the internal unit blocks has a trust structure according to whether or not the non-flat roof units are included in a merging process.

The flat roof point discriminating part may determine which a point which has not an infill shape at a lower end of a lowermost point of each of the flat roof unit blocks as flat roof point.

The combined block dividing part may virtually divide the combined block by using the three planes orthogonal to each other with respect to the flat roof points, may search a plane having a minimum cross-sectional area among the virtually divided parts including a flat roof point and may actually divide the combined block by using a plane having a maximum cross-sectional area among the planes having a minimum cross-sectional area at each of the flat roof points.

According to another aspect of the present invention, there is provided an infill method for an output of a 3D printer, including a unit block generating step of slicing a 3D model by using three planes orthogonal to each other to generate unit blocks; a unit block classifying step of classifying the unit blocks into boundary unit blocks and internal unit blocks according to positions thereof and classifying the boundary unit blocks into flat roof unit blocks and non-flat roof unit blocks according to whether or not a flat roof region is included; a combined block generating step of merging the internal unit blocks and generating a combined block; a flat roof point discriminating step of discriminating flat roof points in the combined block; a combined block dividing step of dividing a part of the combined block including the flat roof points; and an infill shape determining step of determining a divided surface (or contact surface) of the combined block divided by the combined block dividing part as infill shape and outputting a printing material to the infill shape during outputting.

The unit block generating step may tilt three vertical planes orthogonal to each other so that an angle of each surface of the unit blocks with respect to a stacking direction is 45 degrees or more.

The combined block generating step may basically merge the internal unit blocks so that a boundary between the boundary unit block and the internal unit block has a trust structure according to whether or not the non-flat roof units are included in a merging process.

The flat roof point discriminating step may determine a point which has not an infill shape at a lower end of a lowermost point of each of the flat roof unit blocks as flat roof point.

The combined block dividing step may virtually divide the combined block by using the three planes orthogonal to each other with respect to the flat roof points, may search a plane having a minimum cross-sectional area among the virtually divided parts including a flat roof point and may actually divide the combined block by using a plane having a maximum cross-sectional area among the planes having a minimum cross-sectional area at each of the flat roof points.

The combined block dividing operation may repeat the virtual dividing process and the actual dividing process until the flat roof points are removed.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 3b is an alternative view of FIG. 3a;

DETAILED DESCRIPTION OF EXEMPLARY EMBODIMENTS

Exemplary embodiments of an infill apparatus and method for an output of a 3D printer according to the present invention will be described in detail below with reference to the accompanying drawings. In the following description of the present invention, the terms indicating elements of the present invention are defined considering the function of each of the elements and are not intended to limit the technical elements of the present invention.

Figure 2:
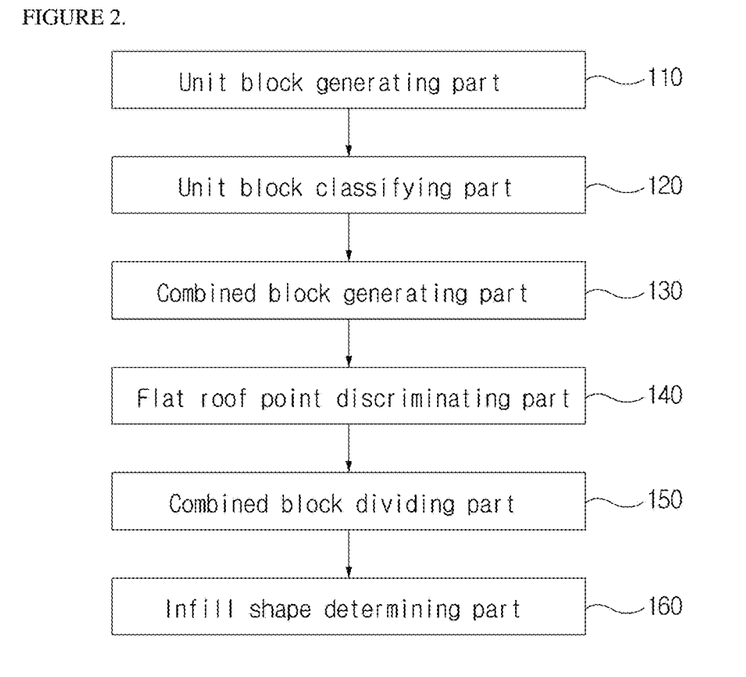
FIG. 2 is a block diagram of an infill apparatus for an output of a 3D printer according to the present invention.

As illustrated in FIG. 2, an infill apparatus for an output of a 3D printer according to the present invention is an apparatus which infills only a flat roof region of a 3D output and thus can reduce a material and a manufacturing time, and includes a unit block generating part 110, a unit block classifying part 120, a combined block generating part 130, a flat roof point discriminating part 140, a combined block dividing part 150 and an infill shape determining part 160.

Figure 3A:
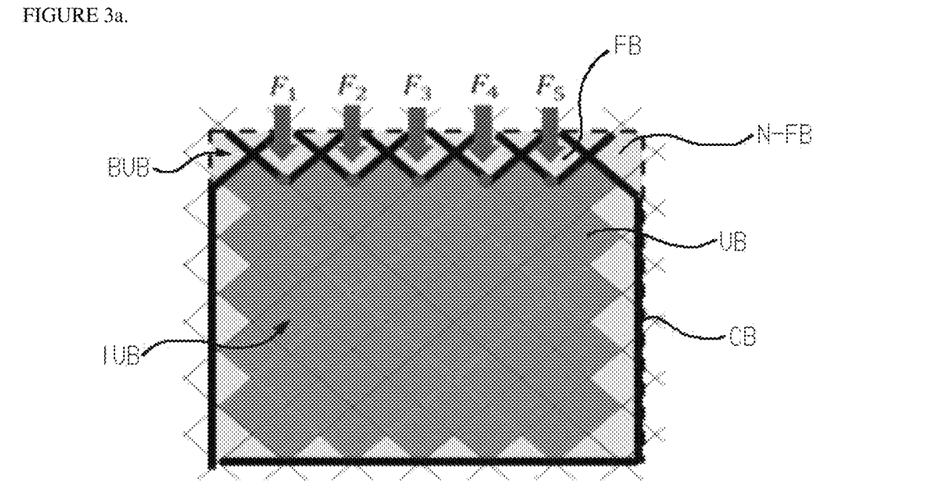
FIG. 3a is an exemplary view of one of sliced surfaces after a 3D image is sliced with three planes.

The unit block generating part 110 slices a 3D model schematized by 3D image data to generate unit blocks UB. Specifically, the unit block generating part 110 generates the unit blocks UB by slicing a 3D model using three planes (e.g., x-y, y-z and z-x planes) orthogonal to each other. FIG. 3a is an exemplary view illustrating one of sliced surfaces after a 3D model is sliced using the three planes, and the surfaces are stacked to form a 3D model.

Here, the unit block generating part 110 slices 1 3D model by tilting the three planes orthogonal to each other so that an angle formed by a normal direction N of a plane of each of the unit blocks UB and a resin stacking direction D is 45 degrees or more. The unit blocks UB arranged at the tilted angle that allows an output to be easily stacked during 3D printing.

The unit block classifying part 120 classifies the unit blocks UB generated by the unit block generating part 110 into boundary unit blocks BUB and internal unit blocks IUB according to positions thereof. Also, the unit block classifying part 120 classifies the boundary unit blocks BUB into flat roof unit blocks FB and non-flat roof unit blocks N-FB according to whether or not a flat roof region is included.

For example, the unit block classifying part 120 classifies the unit blocks located at a boundary portion of a 3D model into boundary unit blocks BUB and classifies the unit block located at an inside of the boundary portion of a 3D model into internal unit blocks IUB. And the unit block classifying part 120 classifies again the boundary unit blocks BUB into flat roof unit blocks FB which include a flat roof region and non-flat roof unit blocks N-FB which do not include a flat roof region. Here, whether or not a flat roof region is included may be determined by a program inputted in advance (e.g., when the unit blocks UB include only a part of a preset triangular mesh, it will be determined as a flat roof).

Figure 3B:
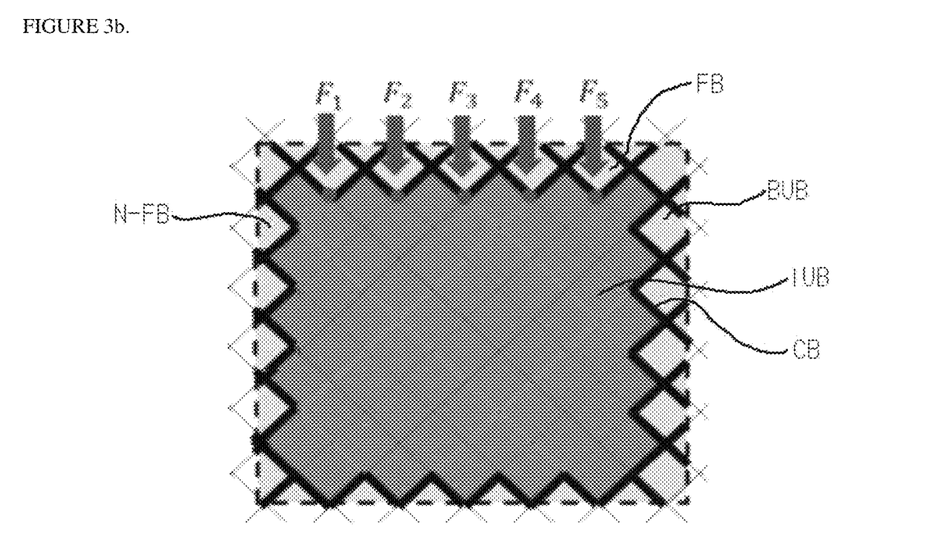

The combined block generating part 130 merges the internal unit blocks IUB and generates a combined block CB. Here, as illustrated in FIG. 3b, the combined block generating part 130 may merge the internal unit blocks IUB so that the boundary portion of the combined block CB has a trust structure. That is, the combined block generating part 130 may merge only the internal unit blocks IUB to generate the combined block CB so that the trust structure is provided at a boundary between the boundary unit blocks BUB and the internal unit blocks IUB. Strength of the output may be increased through the trust structure during the stacking.

The flat roof point discriminating part 140 determines flat roof points F1, F2, F3, F4 and F5 in the flat roof region of the combined block CB. Specifically, the flat roof point discriminating part 140 determines the flat roof point which has not an infill shape at a lower end of a lowermost point of each of flat roof unit blocks as flat roof point.

Figure 4:
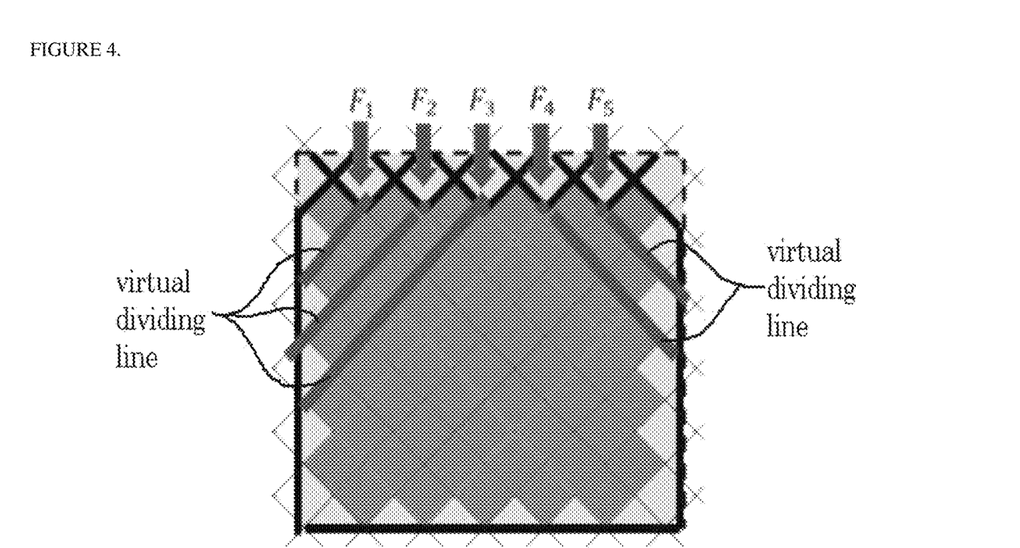
FIG. 4 is a view illustrating a process of virtually dividing a combined block.

The combined block dividing part 150 serves to divide a part of the combined block CB including the flat roof points F1, F2, F3, F4 and F5. Referring to FIG. 4, the combined block dividing part 150 virtually divides the combined block CB by using the three planes orthogonal to each other with respect to each of the flat roof points F1, F2, F3, F4 and F5 which are set in advance. The combined block dividing part 150 searches a plane having a minimum cross-sectional area among the virtually divided parts (refer to a virtual dividing line having the minimum cross-sectional area in FIG. 4). Here, the 'minimum cross-sectional area' means that a region including the flat loop points F1, F2, F3, F4 and F5 has a minimum area and thus the flat roof region is infilled with a minimum amount of material when being infilled. And the combined block dividing part 150 actually divides the combined block CB by using a plane having a maximum cross-sectional area among the planes having the minimum cross-sectional area.

Figure 5:
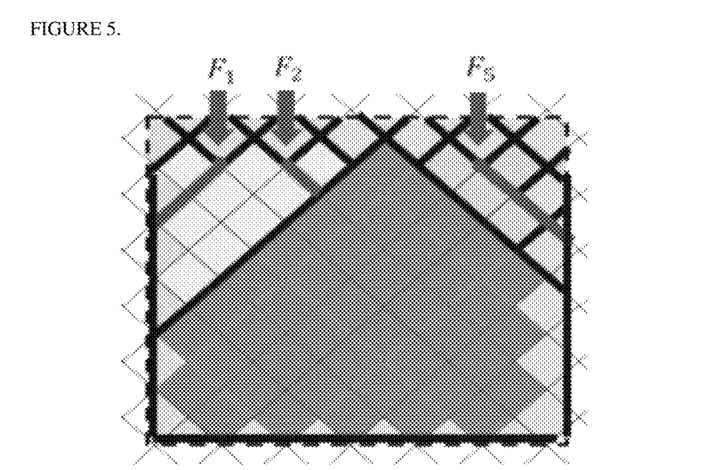
FIG. 5 is a view illustrating a process of actually dividing a combined block.

Preferably, the combined block dividing part 150 repeats the virtual dividing process and the actual dividing process of the combined block CB until all of the flat loop points F1, F2, F3, F4 and F5 are removed. FIG. 5 illustrates the dividing process of the combined block CB. As the combined block is divided, an infill region (indicated by a black line) is generated at a lower end of the flat roof point F3, and thus the flat roof point F3 is removed. When the dividing process is repeated and thus all of the flat roof points are removed, the dividing process of the combined block dividing part 150 is completed.

Figure 6:
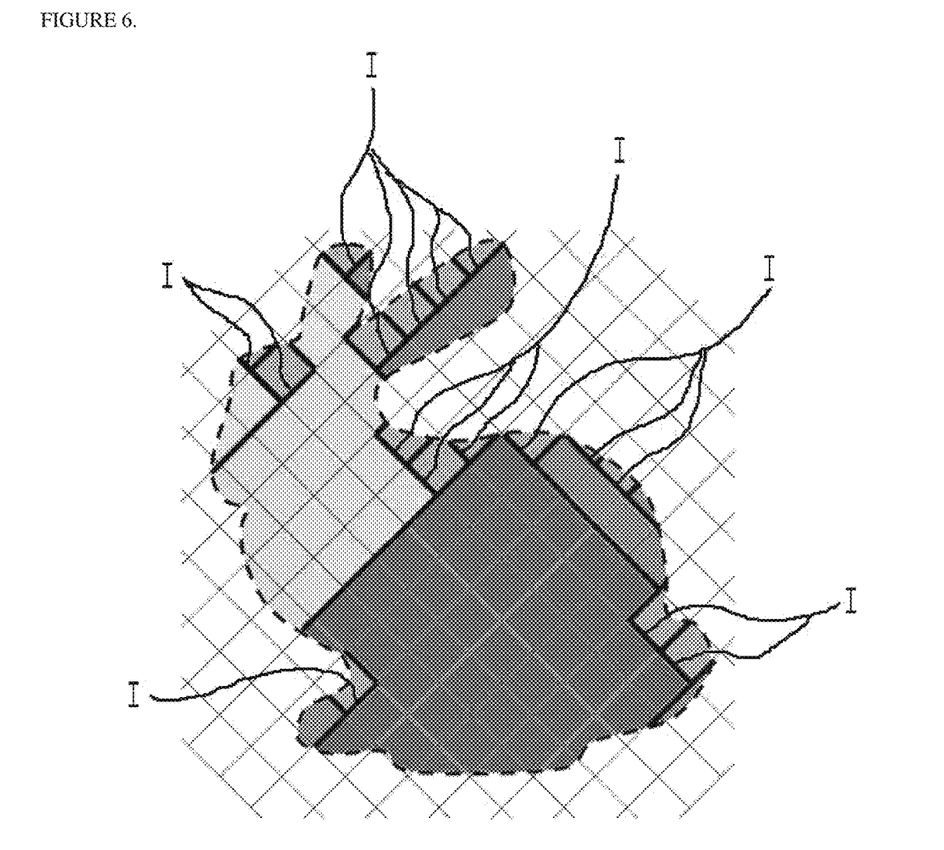
FIG. 6 is a view illustrating an infill region of a 3D model.

Then, the infill shape determining part 160 determines a boundary surface (cut surface or contact surface) of each block as infill region and outputs a printing material, e.g., a resin material along the infill region during outputting of a 3D printer. Referring to FIG. 6, an infill region I (indicated by a thick black line) determined by the infill shape determining part 160 is illustrated. Therefore, the material and the manufacturing time can be reduced by infilling only a part of the region set as the infill shape I (indicated by the thick black line) by using the resin material without infilling the entire inside of an output by using the resin material during the actual 3D printing.

Actually, when a 3D output is outputted by the FDM method, the manufacturing time and the material consumption according to the conventional method and the method of the present invention are compared as follows.

TABLE 1

Comparison of manufacturing time and material consumption according to model size

| | Model size (mm) | | | Manufacturing time | | | Material consumption (g) | | |
|---|---|---|---|---|---|---|---|---|---|
| | Transverse width | Longitudinal width | Height | Total time | Surface | Inside | Total amount | Surface | Inside |
| Conventional art | 108 | 83 | 107 | 6 h 28 m | 1 h 42 m | 4 h 46 m | 80.1 | 20.7 | 59.4 |
| The invention | 108 | 83 | 107 | 4 h 12 m | 1 h 42 m | 2 h 30 m | 47.2 | 20.7 | 26.5 |
| Conventional art | 130 | 99 | 129 | 10 h 36 m | 2 h 24 m | 8 h 12 m | 133.4 | 29.8 | 103.6 |
| The invention | 130 | 99 | 129 | 6 h 15 m | 2 h 24 m | 3 h 51 m | 71.2 | 29.8 | 41.4 |
| Conventional art | 162 | 124 | 161 | 19 h 43 m | 3 h 48 m | 15 h 55 m | 251.2 | 46.6 | 204.6 |
| The invention | 162 | 124 | 161 | 10 h 2 m | 3 h 48 m | 6 h 14 m | 114.6 | 46.6 | 68.0 |

TABLE 2

Comparison of manufacturing time and material consumption according to model density

| | Density (%) | Manufacturing time | | | Material consumption (g) | | |
|---|---|---|---|---|---|---|---|
| | | Total time | Surface | Inside | Total amount | Surface | Inside |
| Conventional art | 10 | 4 h 10 m | 1 h 42 m | 2 h 28 m | 50.4 | 20.7 | 29.7 |
| The invention | 10 | 3 h 36 m | 1 h 42 m | 1 h 54 m | 41.9 | 20.7 | 21.2 |
| Conventional art | 20 | 6 h 28 m | 1 h 42 m | 4 h 46 m | 80.1 | 20.7 | 59.4 |
| The invention | 20 | 4 h 12 m | 1 h 42 m | 2 h 30 m | 47.2 | 20.7 | 26.5 |
| Conventional art | 30 | 8 h 44 m | 1 h 42 m | 7 h 2 m | 109.8 | 20.7 | 89.1 |
| The invention | 30 | 4 h 29 m | 1 h 42 m | 2 h 47 m | 68.0 | 20.7 | 49.1 |

As can be seen from the above Tables, according to the size and the infill density of a 3D model, the manufacturing time of at least 48% and up to 61% can be saved, and the material of at least 56% and up to 67% can be saved.

Figure 7:
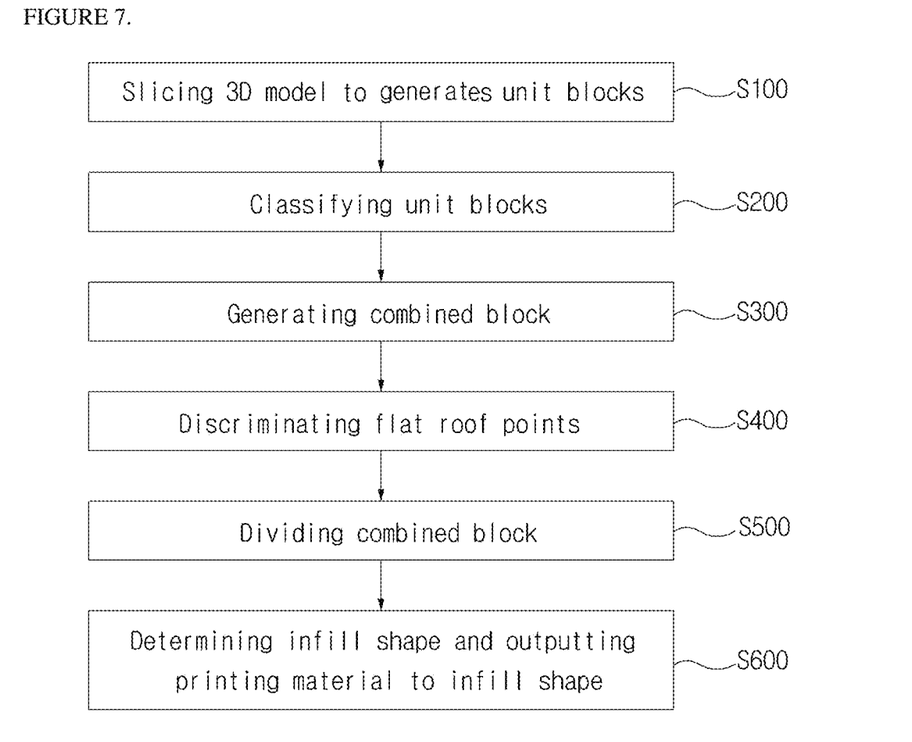
FIG. 7 is a view illustrating a flowchart of an infill method for an output of a 3D printer according to the present invention.

FIG. 7 is a view illustrating a flowchart of an infill method for an output of a 3D printer according to the present invention.

The unit block generating part 110 generates the unit blocks UB by slicing a 3D model using the three planes orthogonal to each other (S100). At this point, the slicing of a 3D model is achieved by tilting the three planes orthogonal to each other so that an angle formed by the normal direction N of the plane of each of the unit blocks UB and the resin stacking direction D is 45 degrees or more.

The unit block classifying part 120 classifies the unit blocks UB into the boundary unit blocks BUB and the internal unit blocks IUB according to the positions thereof and then classifies the boundary unit blocks BUB into the flat roof unit blocks FB and the non-flat roof unit blocks N-FB according to whether or not a flat roof region is included (S200).

The combined block generating part 130 merges the internal unit blocks IUB to generate the combined block CB (S300). Here, as illustrated in FIG. 3*b*, the combined block generating part 130 may merge the internal unit blocks IUB so that the boundary portion of the combined block CB has the trust structure.

The flat roof point discriminating part 140 discriminates flat roof points F1, F2, F3, F4 and F5 in the combined block CB (S400). The flat roof point discriminating part 140 determines points which have not the infill shape at the lower ends of the lowermost points of the flat roof unit blocks as flat roof points F1, F2, F3, F4 and F5.

The combined block dividing part 150 divides a part of the combined block CB including a flat roof point (S500). Here, the combined block dividing part 150 virtually divides the combined block CB by using the three planes orthogonal to each other with respect to each of the flat roof points F1, F2, F3, F4 and F5. And the combined block dividing part 150 searches the plane having the minimum cross-sectional area among the virtually divided parts. Then, the combined block dividing part 150 actually divides the combined block CB by using the plane having the maximum cross-sectional area among the planes having the minimum cross-sectional area. And the combined block dividing part 150 searches a minimum infill shape. i.e., the infill shape I by repeating the virtual dividing process and the actual dividing process of the combined block CB until all of the flat loop points F1, F2, F3, F4 and F5 are removed.

The infill shape determining part 160 determines the boundary surface (cut surface or contact surface) of each block divided by the combined block dividing part 150 as infill shape I (indicated by the thick black line) and outputs a printing material to the infill shape I (indicated by the thick black line) during outputting (S600). Since the determined infill shape I has the minimum area including a flat roof, only minimum materials can be used to support the flat roof during 3D printing, thus the manufacturing time can be reduced.

According to the present invention, the material and manufacturing time can be reduced by using resin material only in the shape for the stacking possibility of some regions set as infill regions without infilling the entire inside of an output with a resin material during 3D printing.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. An infill apparatus for an output of a 3D printer, comprising:
   a unit block generating part which slices a 3D model by using three planes orthogonal to each other to generate unit blocks;
   a unit block classifying part which classifies the unit blocks into boundary unit blocks and internal unit blocks according to positions thereof and classifies the boundary unit blocks into flat roof unit blocks and non-flat roof unit blocks according to whether or not a flat roof region is included;
   a combined block generating part which merges the internal unit blocks and generates a combined block;
   a flat roof point discriminating part which discriminates flat roof points in the combined block;
   a combined block dividing part which divides a part of the combined block including the flat roof points; and
   an infill shape determining part which determines a divided surface (or contact surface) of the combined block divided by the combined block dividing part as infill shape and outputs a printing material to the infill shape during outputting.

2. The infill apparatus of claim 1, wherein the unit block generating part tilts three vertical planes orthogonal to each other so that an angle of each surface of the unit blocks with respect to a stacking direction is 45 degrees or more.

3. The infill apparatus of claim 1, wherein the combined block generating part basically merges the internal unit blocks so that a boundary between the boundary unit blocks and the internal unit blocks has a trust structure according to whether or not the non-flat roof units are included in a merging process.

4. The infill apparatus of claim 1, wherein the flat roof point discriminating part determines which a point which has not an infill shape at a lower end of a lowermost point of each of the flat roof unit blocks as flat roof point.

5. The infill apparatus of claim 1, wherein the combined block dividing part virtually divides the combined block by using the three planes orthogonal to each other with respect to the flat roof points, searches a plane having a minimum cross-sectional area among the virtually divided parts including a flat roof point and actually divides the combined block by using a plane having a maximum cross-sectional area among the planes having a minimum cross-sectional area at each of the flat roof points.

6. The infill apparatus of claim 5, wherein the combined block dividing part repeats the virtual dividing process and the actual dividing process until the flat roof points are removed.

7. An infill method for an output of a 3D printer, comprising:
   a unit block generating step of slicing a 3D model by using three planes orthogonal to each other to generate unit blocks;
   a unit block classifying step of classifying the unit blocks into boundary unit blocks and internal unit blocks according to positions thereof and classifying the boundary unit blocks into flat roof unit blocks and non-flat roof unit blocks according to whether or not a flat roof region is included;
   a combined block generating step of merging the internal unit blocks and generating a combined block;

a flat roof point discriminating step of discriminating flat roof points in the combined block;

a combined block dividing step of dividing a part of the combined block including the flat roof points; and an infill shape determining step of determining a divided surface (or contact surface) of the combined block divided by the combined block dividing part as infill shape and outputting a printing material to the infill shape during outputting.

8. The infill method of claim 7, wherein the unit block generating step tilts three vertical planes orthogonal to each other so that an angle of each surface of the unit blocks with respect to a stacking direction is 45 degrees or more.

9. The infill method of claim 7, wherein the combined block generating step basically merges the internal unit blocks so that a boundary between the boundary unit block and the internal unit block has a trust structure according to whether or not the non-flat roof units are included in a merging process.

10. The infill method of claim 7, wherein the flat roof point discriminating step determines a point which has not an infill shape at a lower end of a lowermost point of each of the flat roof unit blocks as flat roof point.

11. The infill method of claim 7, wherein the combined block dividing step virtually divides the combined block by using three planes orthogonal to each other with respect to the flat roof points, searches a plane having a minimum cross-sectional area among the virtually divided parts including a flat roof point and actually divides the combined block by using a plane having a maximum cross-sectional area among the planes having a minimum cross-sectional area at each of the flat roof points.

12. The infill method of claim 11, wherein the combined block dividing operation repeats the virtual dividing process and the actual dividing process until the flat roof points are removed.

* * * * *